P. L. M. GODEAU.
CHANGE SPEED GEAR.
APPLICATION FILED OCT. 23, 1907.
971,744.
Patented Oct. 4, 1910.
2 SHEETS—SHEET 1.
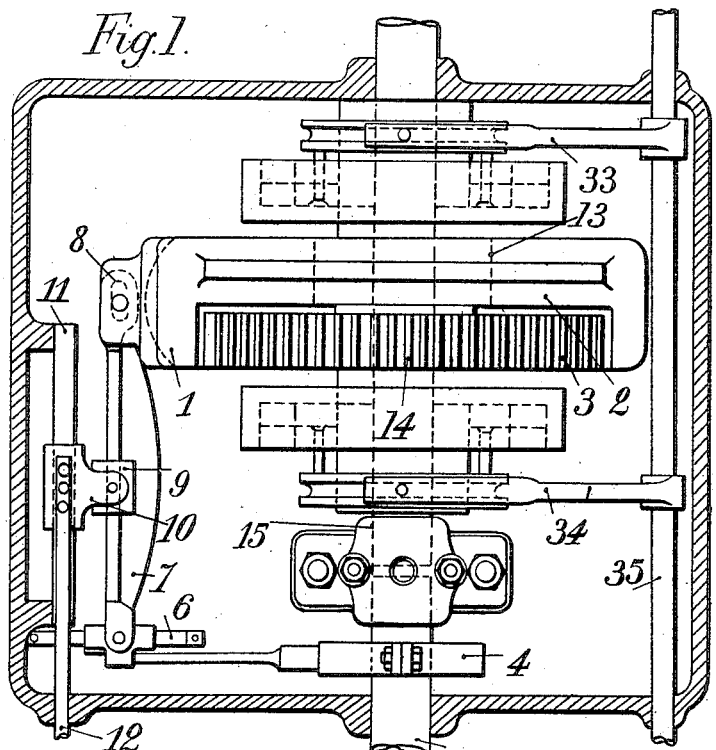
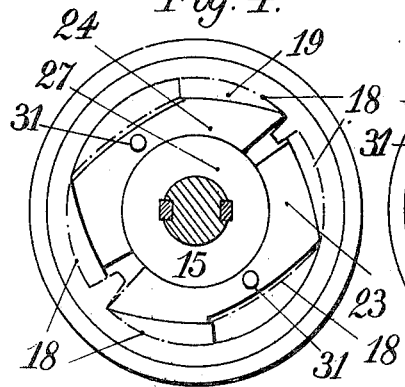
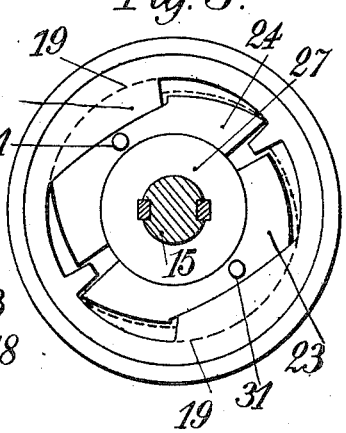
Witnesses:
Inventor:
Pierre Louis Marie Godeau
by Georgii & Massie
his attorneys P. L. M. GODEAU.
CHANGE SPEED GEAR.
APPLICATION FILED OCT. 23, 1907.
971,744.
Patented Oct. 4, 1910.
2 SHEETS—SHEET 2.
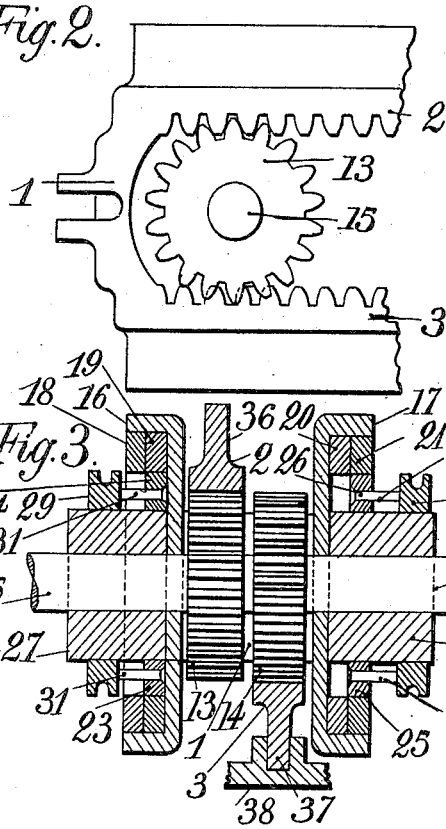
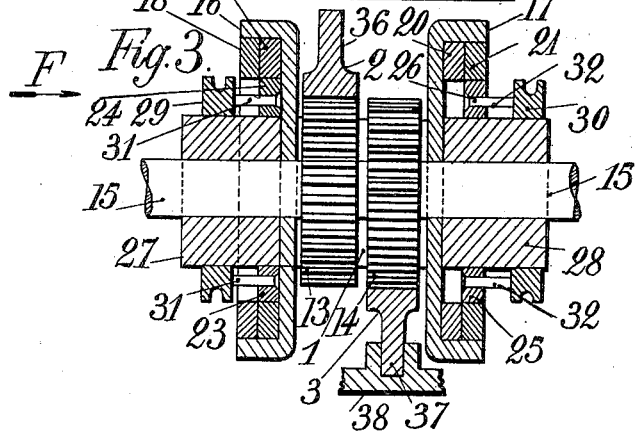
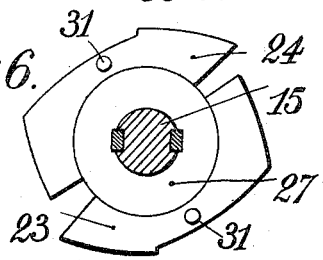
Witnesses:
E. O. Hildebrand
T. Freist
Inventor:
Pierre Louis Marie Godeau
by Georgii & Massie
his Attorneys.

UNITED STATES PATENT OFFICE.

PIERRE LOUIS MARIE GODEAU, OF PARIS, FRANCE.

CHANGE-SPEED GEAR.

971,744. Specification of Letters Patent. Patented Oct. 4, 1910.

Application filed October 23, 1907. Serial No. 398,812.

*To all whom it may concern:*

Be it known that I, PIERRE LOUIS MARIE GODEAU, engineer, of 200 Rue de Javel, Paris, France, have invented a new and useful Improvement in Change-Speed Gear, which improvement is fully set forth in the following specification.

This invention has for its object a progressive change speed gear applicable to all kinds of machinery and which allows any speed ratio to be obtained between a driving shaft and a driven shaft and of passing from one speed ratio to another in an absolutely progressive manner.

The apparatus further allows the direction of rotation of the driven shaft to be reversed, the results before mentioned being obtained whatever may be the direction of rotation and whether the two shafts are turning in the same direction or in different directions. These results are obtained in the present arrangement by means of a double rack each branch of which gears with a pinion loose on the driven shaft, in such a manner that by moving the double rack longitudinally, the two pinions are rotated in opposite directions. Each of these pinions acts through a pawl upon the driven shaft in such manner that the shaft is driven by the pinion when the latter turns in the direction in which the shaft should rotate while it is not driven when the pinion turns in the opposite direction.

The double rack is reciprocated by the driving shaft, and drives the two pinions and these, owing to their rotation in opposite directions and to their respective pawls, act alternately upon the driven shaft and communicate to it a movement of rotation. The double rack is moved by the driving shaft through any suitable arrangement which allows the length of its travel to be varied, for example, by means of an oscillating beam whose fulcrum can be altered at will, the beam being actuated by the driving shaft through an eccentric or other equivalent device. As the rack will thus travel a greater or less distance the driven shaft will rotate at a greater or less speed with respect to the driving shaft. The desired speed relation between the two shafts can therefore be obtained by suitably varying the travel of the double rack. In order to rotate the driven shaft in the reverse direction it is sufficient to reverse the pawl mechanisms by which the two pinions drive the shaft.

The accompanying drawing illustrates one method of carrying out this invention.

Figure 1 is a plan of a complete apparatus. Fig. 2 is a side elevation of the double rack. Fig. 3 is a longitudinal section of the two pinions, the pawl mechanism and the rack. Fig. 4 is a front view of the pawl mechanism of one pinion adjusted for clockwise rotation and in the direction of the arrow F in Fig. 3; the ring situated in front of it is supposed to be removed and is consequently shown in dots. Fig. 5 is a similar view of the same pawl mechanism adjusted for anti-clockwise rotation, the two rings being in plan. Fig. 6 is a front view of the wedges.

1 is a rack having two branches 2 and 3 and given a reciprocating movement through an eccentric 4 on the driving shaft 5. The eccentric 4 gives a reciprocating movement to a slide block 6 to which is pivoted the end of a beam 7 pivoted at its other end 8 to the rack 1; the beam carries a slide 9 pivoted to a runner 10 movable along a guide 11. The runner 10 is actuated and maintained in position by a rod 12. It will be seen that while the eccentric 4 communicates to the slide block 6 a reciprocating movement of constant amplitude, the travel of the rack 1 can be varied by displacing the runner 10, this travel is practically *nil* when the runner 10 is as close as possible to the rack 1 and increases when moved toward the slide block 6.

The branches 2 and 3 of the rack gear respectively, at exactly opposite points as will be seen in Figs. 2 and 3, with two pinions 13 and 14, loose upon the driven shaft 15, in such a manner that these two pinions always turn in a reverse direction to each other when the rack moves in either direction. Each of these pinions is provided with a pawl mechanism which may take the form illustrated.

Fixed to each pinion is a flanged disk 16 and 17 in the interior of each of which are arranged rings 18 and 19 or 20 and 21 shaped as shown in Figs. 4 and 5. The pairs of rings are similar, thus 19 and 21 are as shown at 19 in Fig. 4 and 18 and 20 as shown at 18 in Fig. 5. Each flanged disk is therefore provided with one ring of each type. The disk 16 has two rings 18 and 19 and the disk 17 two rings 20 and 21; these are arranged side by side within the flanged disks as indicated in Fig. 3. Wedges 23 and 24, 25 and 26 which may have the same profile as the teeth of the rings, for example the form indicated in Figs. 4 and 5, slide upon two sleeves 27 and 28 keyed upon the shaft 15.

The wedges are arranged in such a manner as to be submitted to the action of one only of the pair of rings contained within each flanged disk 16 and 17 each ring moreover being similar, that is to say that (Fig. 3) the wedges 23 and 24 in the disk 16 are acted upon by the ring 19 and the wedges 25 and 26 of the disk 17 by the ring 21 which has the same profile as the ring 19.

The wedges are made fast to two collars 29 and 30 by pins 31 and 32 and by moving the collars 29 and 30 laterally by the aid of forks 33 and 34 fixed to the rod 35, the wedges can be made to coincide with the rings 18 and 20 of a profile similar to that indicated in Fig. 5, which then engage with the wedges, while 19 and 20 will no longer be acted upon by them. The wedges engage with the rings 19 and 21 (Figs. 3 and 4) when the pinions and consequently the disks 16 and 17 rotate clockwise and in consequence of the arrangement of the parts the wedges are pressed against the sleeves 27 and 28 keyed upon the shaft 15, and the rings and sleeves will therefore become as one with the disks 16 and 17 and will consequently rotate with them and the shaft 15 will be driven. If rotation takes place in a reverse direction the wedges 25 and 26 will become loose and the shaft 15 will no longer partake in the movement of the disks.

If the wedges are caused to engage with 20 and 22 the shaft 15 will be driven when the disks rotate anti-clockwise and will be left free when they rotate clockwise. The direction of drive is thus reversed. Ribs 36 and 37 carried respectively by the branches 2 and 3 (Fig. 3) of the rack slide in guides such as 38 and insure correct gearing of the rack and pinions.

The working of the apparatus is as follows: The driving shaft 5 being rotated clockwise the eccentric 4 causes the beam 7 to oscillate. If it be supposed that the slide 9 is at the extreme end of its travel toward the rack 3, the latter will remain substantially stationary in consequence of the position of the fulcrum of the beam 7. Suppose also that the wedges are placed opposite the rings 19 and 21 (Figs. 3 and 4) that is to say, in action when the pinions turn clockwise. When the slide 9 is moved, the fulcrum of the beam 7 is altered and the rack 1 will be reciprocated a distance increasing as the slide 9 becomes nearer to 6. It will then rotate the pinions 13 and 14 in opposite directions; when it travels from left to right, 13 will turn clockwise and this being the direction in which the pawls operate, the shaft 15 will be driven while 14 will turn in an opposite direction loose upon the shaft; when on the contrary the rack travels from right to left, 14 will turn clockwise and will drive the shaft 15 while 13 will turn in an opposite direction loose upon this shaft. Therefore by reciprocating the rack the shaft 15 will receive a continuous movement of rotation, being alternately driven by the pinions 13 and 14; this movement will be in the direction in which the pawls operate that is to say, in the present case clockwise, the driving shaft being supposed to turn in this direction. But according to the distance traveled by the rack 1, it requires a greater or less number of oscillations of this rack to rotate the pinions and consequently the shaft 15 one turn and as each reciprocation of the rack corresponds to one turn of the driving shaft, it will require a greater or less number of turns of the driving shaft to rotate the driven shaft one turn; this shaft will rotate therefore at a greater or less speed with respect to the driving shaft, according to the distance the rack travels. By moving the slide 9, the travel of the rack can be varied as desired, therefore any speed ratio may be obtained between the two shafts and the passage from one ratio to another is obtained progressively by the progressing movement of the slide 9 by the rod 12. In order to change the direction of rotation of the shaft 15, it will be sufficient to reverse the pawl arrangement by the movement of the rod 35, and all speed ratios may be progressively obtained in the reverse direction.

It is evident that the apparatus herein before described is only one form in which the invention can be carried out; the details can be varied especially the method of oscillating the beam, the gearing, etc.

Having now particularly described and ascertained the nature of my said invention and in what manner the same is to be performed, I declare that what I claim is:

1. In a speed change gear, the combination, of a driving shaft, a driven shaft, an oscillatory beam having one end connected to the driving shaft to be actuated thereby, a fulcrum for said beam between its ends, mechanism to transmit the reciprocating motion of the beam as a continuous rotary motion to the driven shaft, said mechanism comprising a pair of rack bars attached to one end of the beam and mounted to reciprocate across the axial line of the driven shaft, a pair of pinions loose on the shaft and each meshing with one of the rack bars, a pair of rings carried by each pinion and arranged concentrically therewith, said rings having internal oppositely disposed wedge-shaped teeth, and wedges mounted on the shaft and adapted to engage the teeth of either ring to lock the same to the shaft, and means to shift the fulcrum of the beam to vary the speed of the driven shaft.

2. In a speed change gear, the combination, of a driving shaft, a driven shaft, an oscillatory beam having one end connected to the driving shaft to be actuated thereby, a fulcrum for said beam between its ends, mechanism to transmit the reciprocating motion of the beam as a continuous rotary motion to the driven shaft, said mechanism comprising a pair of rack bars attached to one end of the beam and mounted to reciprocate across the axial line of the driven shaft, a pair of pinions loose on the shaft and each meshing with one of the rack bars, a pair of rings carried by each pinion and arranged concentrically therewith, each ring having internal wedge-shaped teeth, the teeth being so arranged as to project in opposite directions in the rings of each pair and also in the corresponding rings of the pairs, and wedges slidably mounted on the shaft and arranged to engage teeth of said rings to lock them to the shaft during one movement of the rack bars, and thereby rotate the shaft, means for shifting the wedges into engagement with either ring of a pair and thereby control the direction of rotation of the shaft, and means to shift the fulcrum of the beam to vary the speed of the driven shaft.

3. In a speed change gear, the combination, of a driving shaft, a driven shaft, an oscillatory beam having one end connected to the driving shaft to be actuated thereby, a fulcrum for said beam between its ends, mechanism to transmit the reciprocating motion of the beam as a continuous rotary motion to the driven shaft, said mechanism comprising a pair of rack bars attached to one end of the beam and mounted to reciprocate across the axial line of the driven shaft, a pair of pinions loose on the shaft and each meshing with one of the rack bars, a flanged disk fast to the outer face of each pinion, a pair of rings inclosed by the flange of each disk and provided with internal wedge-shaped teeth, wedges slidably mounted on the shaft and arranged to engage the said teeth and thereby lock the shaft to the disks through the rings, means for shifting the wedges to cause them to engage the teeth of either ring, and means to shift the fulcrum of the beam to vary the speed of the driven shaft.

4. The combination of a shaft, a pair of rack bars mounted to reciprocate across the axial line of the shaft, means for reciprocating the rack bars, a pair of pinions loose on the shaft and each meshing with one of the rack bars, a pair of rings carried by each pinion and arranged concentrically therewith, said rings having internal oppositely disposed wedge-shaped teeth, and wedges mounted on the shaft and adapted to engage the teeth of either ring to lock the same to the shaft.

5. The combination of a shaft, a pair of rack bars mounted to reciprocate across the axial line of the shaft, means for reciprocating the rack bars, a pair of pinions loose on the shaft and each meshing with one of the rack bars, a pair of rings carried by each pinion and arranged concentrically therewith, each ring having internal wedge-shaped teeth, the teeth being so arranged as to project in opposite directions in the rings of each pair and also in the corresponding rings of the pairs, and wedges slidably mounted on the shaft and arranged to engage teeth of said rings to lock them to the shaft during one movement of the rack bars, and thereby rotate the shaft, and means for shifting the wedges into engagement with either ring of a pair and thereby control the direction of rotation of the shaft.

6. The combination of a shaft, a pair of rack bars arranged to reciprocate across the axial line of the shaft, means for reciprocating the rack bars, a pair of pinions loose on the shaft and each meshing with one of the rack bars, a flanged disk fast to the outer face of each pinion, a pair of rings inclosed by the flange of each disk and provided with internal wedge-shaped teeth, wedges slidably mounted on the shaft and arranged to engage the said teeth and thereby lock the shaft to the disks through the rings, and means for shifting the wedges to cause them to engage the teeth of either ring.

In testimony whereof I have signed this specification in the presence of two subscribing witnesses.

PIERRE LOUIS MARIE GODEAU.

Witnesses:
JEAN VAUCHER,
H. C. COXE.